Patented Sept. 4, 1928.

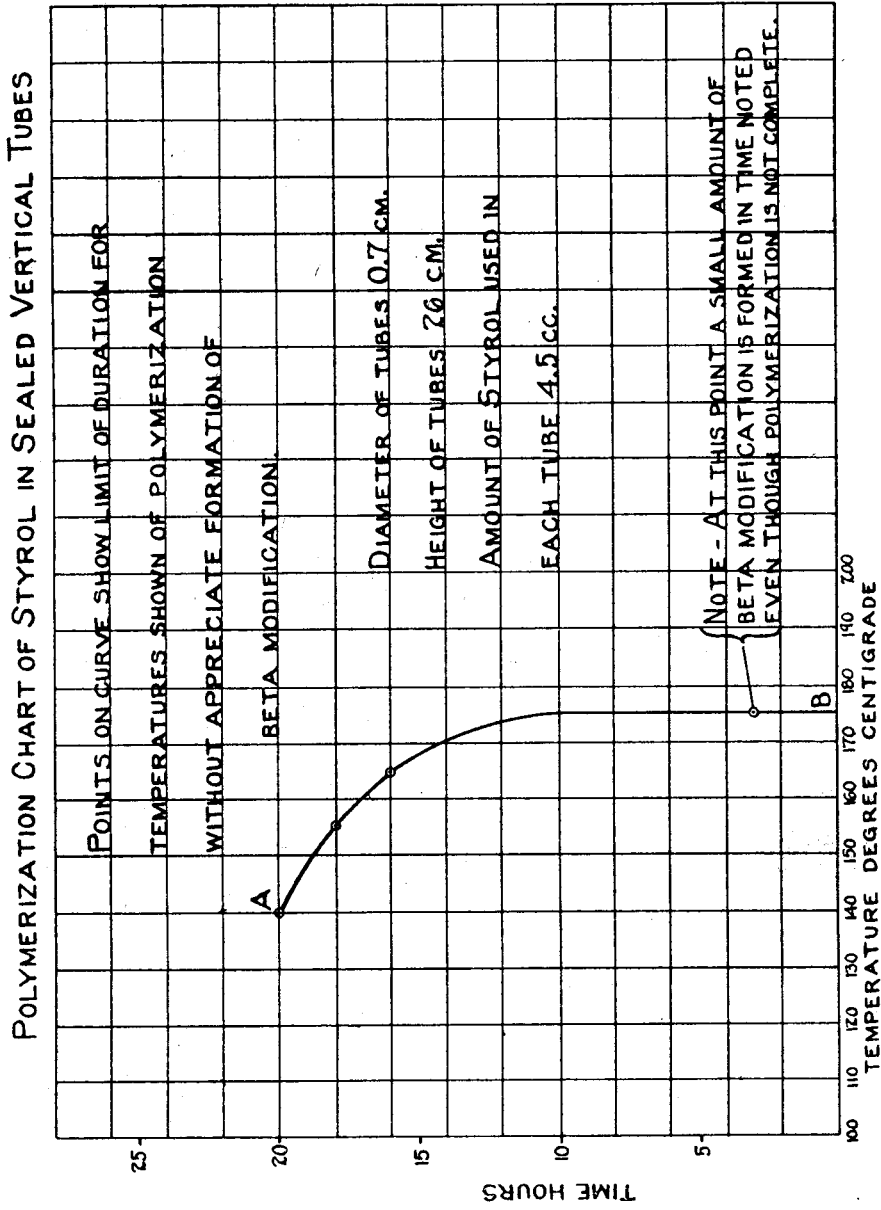

1,683,403

UNITED STATES PATENT OFFICE.

IWAN OSTROMISLENSKY, OF NEW YORK, N. Y., ASSIGNOR TO THE NAUGATUCK CHEMICAL COMPANY, OF NAUGATUCK, CONNECTICUT, A CORPORATION OF CONNECTICUT.

POLYMERIZED STYROL AND ITS HOMOLOGUES AND PROCESS FOR THE POLYMERIZATION OF STYROL AND ITS HOMOLOGUES.

Original application filed July 12, 1924, Serial No. 725,658. Divided and this application filed January 30, 1925. Serial No. 5,893.

This invention relates to polymerized styrol and its homologues and to processes for the polymerization of styrol and its homologues.

This application is a division of my copending application Serial No. 725,658, filed July 12, 1924.

The object of the invention is to provide products having a considerable range of characteristics, and particularly products which are herein called polymerized ArCH:-$CH_2$, where Ar is aryl, and more specifically polymerized styrol. These products resemble celluloid and "bakelite" but differ from these products in that the polymers are free from the former of high combustibility. Furthermore the polymers are more transparent than celluloid and "bakelite" and when freshly made have a transparency about equal to that of ordinary glass. The polymers of ArCH:$CH_2$ can be molded in their final form, an advantage which neither celluloid nor "bakelite" possess, since they require a chemical reaction at the time of molding in the case of "bakelite" or in the subsequent evaporation of a solvent in the case of celluloid. Another object of the invention is to provide simple and inexpensive processes for the polymerization of such materials.

This application is a continuation in part of application Serial No. 648,803, filed June 30, 1923, and describes among others products which may result from the process described in copending applications Serial Nos. 711,584, and 711,585, both filed May 7, 1924.

The application Serial No. 648,803, filed June 30, 1923, describes the polymerization of crude styrol, depolymerizing the solid product thus obtained, removing impurities, and repolymerizing the purified styrol recovered therefrom. This application also includes depolymerizing waste meta styrol for purposes of utilizing the styrol therein. The application Serial No. 711,584 is a continuation in part of Serial No. 648,803 and is concerned with the polymerization of an impure styrol to a brittle product, depolymerizing the brittle product, and separating the majority of non-styrol hydrocarbons, and repolymerizing the styrol portion to a tough transparent product. Application Serial No. 711,585 describes a method for obtaining a tough, transparent polymerized styrol from a styrol solution or mixture which contains at least 40% of unpolymerized styrol by polymerizing at 135–200° C. with access of air.

The invention accordingly comprises polymerized ArCH:$CH_2$ where Ar is aryl, and includes polymerized styrol which I prefer to designate herein as beta meta ArCH:$CH_2$ and beta meta styrol respectively. The term "meta" as herein employed in the expression "alpha meta styrol" and the like does not designate the position of a group but refers rather to the polymerized form of styrol etc. The group of substances characterized as alpha meta ArCH:$CH_2$ and alpha meta styrol form the subject matter of copending application Serial No. 725,658, filed July 12, 1924. The properties which distinguish these substances will be described in detail later in the specification. The invention also includes processes for the polymerization of beta meta ArCH:$CH_2$ and beta meta styrol and its homologues.

Beta meta styrol may be formed from styrol of approximately 92% purity and the homologues of beta meta styrol may be formed from ArCH:$CH_2$ where Ar is aryl. By exposing styrol in a suitable quantity to the action of heat for a sufficient length of time beta meta styrol is formed. The temperature and time required to produce beta meta styrol is in general in excess of that required to produce the alpha modification. As stated in my copending application Serial No. 725,658, filed July 12, 1924, the production of alpha meta styrol, in so far as time and temperature are concerned, follows a fairly definite curve, which may be approximately expressed by plotting the time versus temperature values 20 hrs.—140°, 18 hrs.— 155°, 16 hrs.—165°, 10 hrs.—175°, 5 hrs.— 175° C. This polymerization curve is designated by the curve A—B on the accompanying drawing, which forms part of the present specification. Times and temperatures lying well within the area bounded by this curve and the axis result in the formation of the alpha modification. Times and temperatures lying well beyond the curve expressed by the above equation result in the formation of the beta modification according to the conditions in the following examples. The amount of beta meta styrol produced upon a slight excess of time or temperature will be relatively small for different points along the above curve, but will increase as the time and temperature for any given point along the curve are increased.

*Example 1.*—A specific example of the production of beta meta styrol is as follows: Styrol of upwards of 92% purity is heated in a sealed glass tube half filled with the material and placed in a horizontal position, the heating being continued for 40 hours in an air bath heated to 140° C. approximately, at the end of which time polymerization is substantially complete with the production of beta meta styrol. The tube may be 0.7 by 26 cm., having a volume of approximately 10.0 cc. in which case the amount of styrol which may be satisfactorily employed is about 5.0 cc.

*Example 2.*—A sealed glass tube half filled with styrol of upward of 92% purity is heated for 18 hours in an air bath heated to 170° C. in a horizontal position at the end of which time polymerization is substantially complete with the production of beta meta styrol.

*Example 3.*—Under similar conditions styrol is heated for 12 hours in a bath heated to 180° C. at the end of which time polymerization is substantially complete with the production of beta meta styrol.

*Example 4.*—Under similar conditions styrol is heated for 22 hours in an air bath heated to 140° C. at the end of which time polymerization is substantially complete with the production of beta meta styrol.

*Example 5.*—Under similar conditions styrol is heated for 2½ hours in an air bath heated to 185° C. at the end of which time polymerization is substantially complete with the production of beta meta styrol.

If the styrol is heated for a shorter time than given in the examples above, it is apt to become a mixture of the alpha and beta modifications in which case the vitreous product shows in some places a lustrous and in others a mat or dull fracture.

As in the case of the alpha modification the speed at which the beta modification is formed depends not only on the temperature but on the amount of styrol as well as on the shape of the vessel in which the polymerization is carried out. I have often observed that when the sealed glass tube is placed in a horizontal position the polymerization of styrol to beta meta styrol takes place much faster than when the tube stands upright. For instance when the polymerization is conducted in a sealed glass tube placed in a vertical position at 180° C. beta meta styrol is formed in 75 hours while when under similar conditions the same tube is fixed horizontally, the reaction takes place in 12 hours. It is of course understood that tubes of other dimensions may be employed but those especially suitable have a greater length than diameter. The beta modification, however, need not necessarily be made in tubular containers.

Beta metal styrol is a transparent substance which may be substantially colorless. The transparency is usually lost on standing, at first in spots and finally the mass becomes dull and slightly translucent. The fracture of beta meta styrol is shiny and lustrous. It is not susceptible to cutting, sawing, planing, and polishing operations, cracking badly when subjected to these operations. When cut with a knife it splits into small grains, the surface of the cut being shiny and pitted. When hit with a hammer a relatively weak blow, or when dropped from a relatively inconsiderable height it cracks. It can be readily ground to a powder in a porcelain mortar. On cooling after complete polymerization it detaches itself from the sides of the glass vessel in which it was polymerized without breaking it. Heated to 100° C. it becomes appreciably more plastic and gradually loses its shape. The transverse tensile strength is 1000 lbs. per square inch. Upon dry distillation it produces approximately the same results as alpha meta styrol that is it produces as high as 70° of its weight in styrol when heated at 375–475° C. When treated with bromine in the manner indicated for alpha meta styrol practically the same result is effected as with the alpha modification in that when in solution it does not decolorize a 3% solution of bromine at 0° C. Its reaction with prolonged treatment of hydrofluoric acid is the same as for alpha modification both materials being substantially unchanged. The beta modification of meta styrol as prepared in the above manner is substantially free from unpolymerized styrol.

It should be noted that alpha meta styrol may be transformed to the beta meta styrol by heating the alpha in an open vessel at normal pressure. The length of the process depends upon the quantity and shape of the pieces of the original alpha meta styrol. In vacuo the transformation proceeds faster than it does under normal pressure.

As many apparently widely different embodiments of this invention may be made without departing from the spirit thereof, it is to be understood that I do not intend to limit myself to the specific form of the invention as set forth except as indicated in the appended claims.

Having thus described my invention, what I claim and desire to protect by Letters Patent is:

1. A process for forming beta meta styrol which comprises heating the styrol of approximity 92% or greater purity in a substantially horizontal tube for approximately 40 hrs. in an air bath heated to approximately 140° C.

2. As new compounds, the beta meta styrols, substantially colorless transparent substances having a shiny, lustrous fracture, splitting into grains when cut, detachable from the sides of a glass polymerizing vessel without breaking the vessel, and easily reducible to a powder by grinding, said compounds being substantially free of unpolymerized styrols.

Signed at Cromwell, county of Middlesex, and State of Connecticut this 26th day of January, 1925.

IWAN OSTROMISLENSKY.